United States Patent
Yan et al.

(10) Patent No.: US 8,331,496 B2
(45) Date of Patent: Dec. 11, 2012

(54) PHASE RECOVERY DEVICE, PHASE RECOVERY METHOD AND RECEIVER FOR 16 QAM DATA MODULATION

(75) Inventors: Meng Yan, Beijing (CN); Zhenning Tao, Beijing (CN); Shoichiro Oda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 63 days.

(21) Appl. No.: 12/896,476

(22) Filed: Oct. 1, 2010

(65) Prior Publication Data

US 2011/0116809 A1    May 19, 2011

Related U.S. Application Data

(63) Continuation of application No. PCT/CN2009/073231, filed on Aug. 13, 2009.

(51) Int. Cl.
*H04L 27/00* (2006.01)
(52) U.S. Cl. ........ 375/324; 375/320; 375/325; 375/371; 375/375
(58) Field of Classification Search .......... 375/324, 375/320
See application file for complete search history.

(56) References Cited

U.S. PATENT DOCUMENTS

5,684,835 A * 11/1997 Kroeger et al. ............... 375/325
* cited by examiner

*Primary Examiner* — Lihong Yu
(74) *Attorney, Agent, or Firm* — Staas & Halsey LLP (57) ABSTRACT

The present invention relates to a phase recovery device, phase recovery method and receiver for 16 QAM data modulation. The phase recovery device comprises: a fourth power calculator for calculating fourth power values of respective symbols in a symbol block; a classification unit for classifying respective symbols in the symbol block based on amplitudes, so as to classify respective symbols in the symbol block into a first category having a large or small amplitude, and a second category having an intermediate amplitude; a reference point determination unit for determining a reference point based on categories of respective symbols in the symbol block and their fourth power values; a rotation unit for rotating respective symbols in the symbol block undergone the fourth power operations and being classified into the second category, based on the reference point; and a phase estimation unit for performing phase estimations based on respective symbols in the symbol block undergone the fourth power operations and being classified into the first category, and respective rotated symbols in the symbol block undergone the fourth power operations and being classified into the second category.

10 Claims, 6 Drawing Sheets

PHASE RECOVERY DEVICE, PHASE RECOVERY METHOD AND RECEIVER FOR 16 QAM DATA MODULATION

CROSS REFERENCE TO RELATED APPLICATIONS

This application is a continuation of PCT/CN2009/073231, filed Aug. 13, 2009, the disclosure of which is incorporated herein by reference.

FIELD OF THE INVENTION

The present invention relates to the optical communication, and the present invention relates to a digital coherent optical receiver.

DESCRIPTION OF THE RELATED ART

The coherent optical communication technique is deemed as a key technique for improving the optical communication system capacity. At present, the coherent optical communication system usually adopts a modulation format of Quadrature Phase Shift Keying (QPSK). In order to further improve the transmission capacity, a modulation format of higher order, such as 16 Quadrature Amplitude Modulation (QAM), can be used. One QAM symbol carries four bits information, while one QPSK symbol only carries 2 bits information, thus 16 QAM has a higher spectrum efficiency than the QPSK. In the coherent optical communication system, since a laser at the transmitting terminal and a local oscillation laser at the receiving terminal both have certain line widths, a phase recovery must be carried out in order to get a correct signal at the receiving terminal. Some methods have been provided for 16QAM phase recovery, and the methods can be divided into a feedforward type and feedback type. The method of Literature 1 is a feedforward type method, in which the phase estimation of each symbol is not dependent on phase estimation results of other symbols, thus the phase estimations can be parallelized, i.e., a plurality of digital signal processing units can be simultaneously used to perform phase estimations of a plurality of symbols. The parallelization greatly reduces the requirement on the DSP processing speed. Literature 2 discloses a method based on decision-directed, which is equivalent to a digital phase locked loop. But the baud rate of the optical communication system is very high, the delay of the phase locked loop is strictly required, and the current DSP technique is difficult to implement a phase locked loop that meets the delay requirement. Although the method of Literature 3 is a feedforward type method, it is based on pre-decision, and the phase estimation of the current symbol depends on phase estimation results of previous symbols, so the parallelization cannot be carried out.

The method of Literature 1 in the prior art is briefly introduced as follows.

Figure 1:
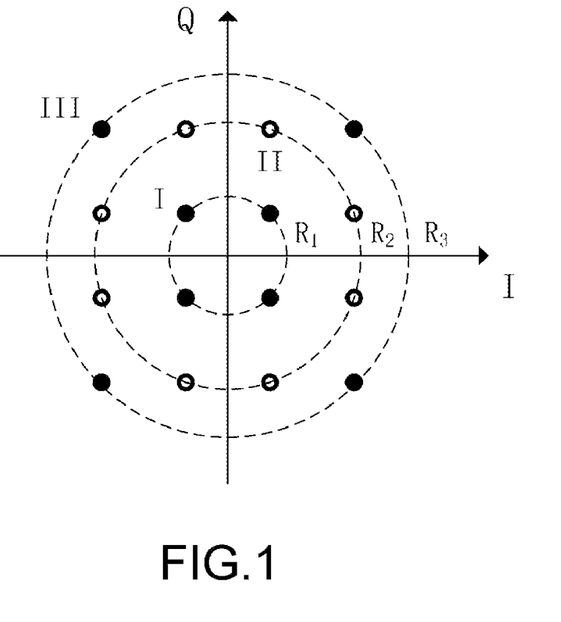
FIG. 1 illustrates an ideal 16QAM constellation having no noise.
Figure 2:
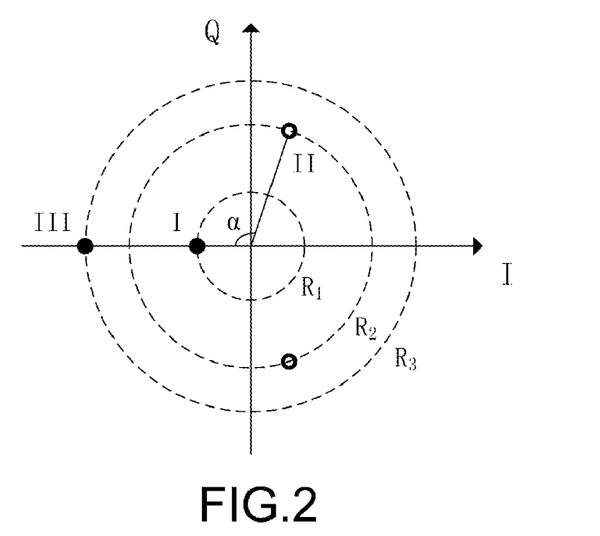
FIG. 2 illustrates constellation points obtained by performing fourth power operations of ideal 16QAM constellation points and maintaining their amplitudes.
Figure 3:
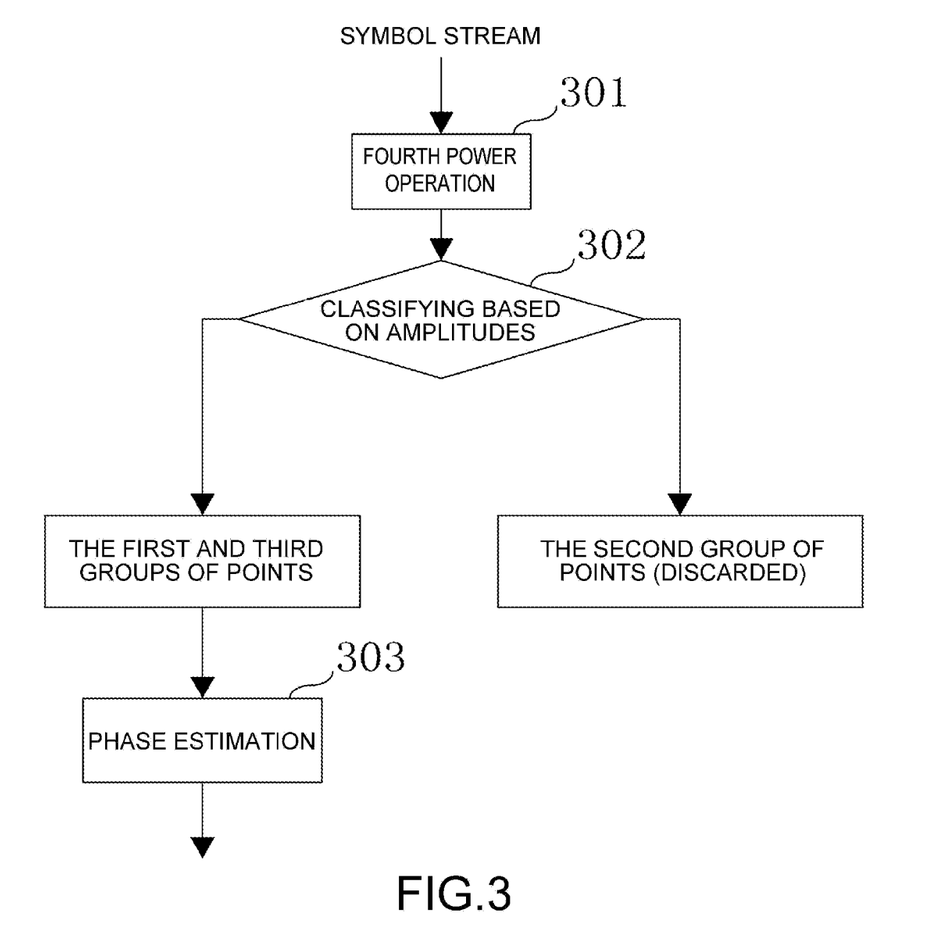
FIG. 3 schematically illustrates a processing flow of a phase recovery method in the prior art.

FIG. 1 illustrates an ideal 16QAM constellation having no noise. FIG. 2 illustrates constellation points obtained by performing fourth power operations of ideal 16QAM constellation points and maintaining their amplitudes. FIG. 3 illustrates a processing flow that uses a phase recovery device in Literature 1.

As shown in FIG. 1, the 16QAM symbol has three types of amplitudes, and the 16QAM constellation points can be divided into three groups according to their amplitudes. The first group of points are located on the inner ring and has a minimum amplitude $R_1$. The second group of points are located on the intermediate ring and has an intermediate amplitude $R_2$. The third group of points are located on the outer ring and has a maximum amplitude $R_3$ ($R_1 < R_2 < R_3$) (herein the "point" refers to the constellation point, and is the reflection of the symbol on the I-Q plane; according to the context, the meaning of the "point" in the embodiment of the present invention is equivalent to that of the "symbol"). The arguments of the first and third groups of points are $$\frac{k\pi}{2} + \frac{\pi}{4}$$

(k=0, 1, 2, 3), and the arguments of the second group of points are $$\frac{k\pi}{2} \pm \arctan\left(\frac{1}{3}\right)$$

After calculating the fourth power value of the symbol, the arguments of the first and third groups of points are π and in a negative direction of the lateral axis, while the arguments of the second group of points may be two possible values (see FIG. 2) forming an angle $$\alpha = \pi - 4 * \arctan\left(\frac{1}{3}\right)$$

with the negative direction of the lateral axis. As shown in FIG. 3, in the current method of Literature 1, the fourth power value of each symbol in a symbol block is firstly calculated (step 301), then the symbols are divided into three groups based on their amplitudes in step 302, next, the phase estimations in step 303 only use the symbols of the first and third groups. That is to say, in the 16QAM phase recovery method of the prior art, only the first and third groups of points are used, and the second group of points are discarded.

During the process of studying the present invention, the inventor finds that the second group of points almost occupies a half of an symbol block, while the second group of points are discarded in the method of the prior art. As a result, the noise depression degree is decreased, and the phase recovery accuracy is affected.

Literature 1: M. Seimetz, Performance of coherent optical square-16-QAM systems based on IQ-transmitter and homodyne receivers with digital phase estimation. OFC2006, NWA4.

Literature 2: Y. Mori, Transmission of 40 Gb/s 16QAM signal over 100 km standard single mode fiber using digital coherent optical receiver. ECOC2008, Tu.1.E.4.

Literature 3: H. Louchet, Improved DSP algorithm for coherent 16QAM transmission. ECOC2008, Tu.1.E.6.

Literature 4: D.-S. Ly-Gagnon, Coherent detection of optical quadrature phase-shift keying signals with carrier phase estimation. J. of Lightwave Technol., vol. 24, no. 1, 2006.

SUMMARY OF THE INVENTION

In view of the above problems, the embodiments of the present invention are provided to eliminate or relieve one or more problems of the prior art, and give at least one beneficial selection.

In order to achieve the above object, the embodiments of the present invention provide the following aspects.

Aspect 1, a phase recovery device for 16 QAM data modulation, including: a fourth power calculator for calculating fourth power values of respective symbols in a symbol block; a classification unit for classifying respective symbols in the symbol block based on amplitudes, so as to classify respective symbols in the symbol block into a first category having a large or small amplitude, and a second category having an intermediate amplitude; a reference point determination unit for determining a reference point based on categories of respective symbols in the symbol block and their fourth power values; a rotation unit for rotating respective symbols in the symbol block undergone the fourth power operations and being classified into the second category, based on the reference point; and a phase estimation unit for performing phase estimations based on respective symbols in the symbol block undergone the fourth power operations and being classified into the first category, and respective rotated symbols in the symbol block undergone the fourth power operations and being classified into the second category.

Aspect 2, the phase recovery device for 16 QAM data modulation according to aspect 1, wherein the reference point determination unit determines the reference point by: determining a sum of the symbols in the symbol block undergone the fourth power operations and being classified into the first category, i.e., a first sum; determining a sum of the symbols in the symbol block undergone the fourth power operations and being classified into the second category, i.e., a second sum; and subtracting the second sum multiplied by a coefficient from the first sum, wherein the coefficient is not less than 0 and not more than 1.

Aspect 3, the phase recovery device for 16 QAM data modulation according to aspect 2, wherein the coefficient is 0.5.

Aspect 4, The phase recovery device for 16 QAM data modulation according to aspect 1, wherein the rotation unit rotates the symbols in the symbol block undergone the fourth power operations and being classified into the second category by: determining an argument difference between each of the symbols in the symbol block undergone the fourth power operations and being classified into the second category and the reference point; if the argument difference is between 0 to $\pi$, rotating corresponding symbol in the symbol block undergone the fourth power operation and being classified into the second category by $-\alpha$, $\alpha=\pi-4\times\arctan(\frac{1}{3})$; and if the argument difference is between $-\pi$ to 0, rotating corresponding symbol in the symbol block undergone the fourth power operation and being classified into the second category by $\alpha$.

Aspect 5, a digital coherent optical receiver, wherein the digital coherent optical receiver includes the phase recovery device for 16 QAM data modulation according to any one of aspects 1 to 4.

Aspect 6, a phase recovery method for 16 QAM data modulation, including: calculating fourth power values of respective symbols in a symbol block; classifying respective symbols in the symbol block based on amplitudes, so as to classify respective symbols in the symbol block into a first category having a large or small amplitude, and a second category having an intermediate amplitude; determining a reference point based on categories of respective symbols in the symbol block and their fourth power values; rotating symbols in the symbol block undergone the fourth power operations and being classified into the second category, based on the reference point; and performing phase estimations based on respective symbols in the symbol block undergone the fourth power operations and being classified into the first category, and respective rotated symbols in the symbol block undergone the fourth power operations and being classified into the second category.

Aspect 7, the phase recovery method for 16 QAM data modulation according to aspect 6, wherein, the determining determines the reference point by: determining a sum of the symbols in the symbol block undergone the fourth power operations and being classified into the first category, i.e., a first sum; determining a sum of the symbols in the symbol block undergone the fourth power operations and being classified into the second category, i.e., a second sum; and subtracting the second sum multiplied by a coefficient from the first sum, wherein the coefficient is not less than 0 and not more than 1.

Aspect 8, the phase recovery method for 16 QAM data modulation according to aspect 7, wherein the coefficient is 0.5.

Aspect 9, the phase recovery method for 16 QAM data modulation according to aspect 6, wherein the rotating rotates the symbols in the symbol block undergone the fourth power operations and being classified into the second category by: determining an argument difference between each of the symbols in the symbol block undergone the fourth power operations and being classified into the second category and the reference point; if the argument difference is between 0 to $\pi$, rotating corresponding symbol in the symbol block undergone the fourth power operation and being classified into the second category by $-\alpha$, $\alpha=\pi-4\times\arctan(\frac{1}{3})$; and if the argument difference is between $-\pi$ to 0, rotating corresponding symbol in the symbol block undergone the fourth power operation and being classified into the second category by $\alpha$.

Aspect 10, the phase recovery method for 16 QAM data modulation according to aspect 6, wherein the classifying firstly recovers the amplitudes of respective symbols undergone the fourth power operations to those before the fourth power operations, then compares the recovered amplitudes of respective symbols with predetermined thresholds $T_1$ and $T_3$, if the recovered amplitudes are between $T_1$ and $T_3$, the symbols are classified into the second category, otherwise the symbols are classified into the first category.

Aspect 11, the phase recovery method for 16 QAM data modulation according to aspect 11, wherein $$T_1=(R_1+R_2)/2, T_2=(R_2+R_3)/2,$$

$R_1$, $R_2$ and $R_3$ are amplitudes of ideal 16QAM constellation points.

The embodiment of the present invention sufficiently utilizes received signals, and as compared with the prior art not sufficiently utilizing received signals (or only utilizing a part thereof), the phase estimation accuracy is improved. As proved by the results of simulations and experiments, the method in the embodiment of the present invention achieves a bit error rate lower than that achieved by the method of Literature 1 in the prior art.

In reference to the following descriptions and drawings, these and further aspects and features will be clearer. The descriptions and drawings concretely disclose the specific embodiments of the present invention, and specify the principle of the invention and the ways that can be adopted. It shall be understood that the scopes of the embodiments of the present invention are not limited thereby. Within the range of the spirit and provisions of the accompanied claims, the embodiments of the present invention include various changes, modifications and equivalents.

Features described and/or illustrated with respect to one embodiment can be used in one or more other embodiments in the same or similar way, by combining features in other embodiments or replacing features in other embodiments.

To be emphasized, the term "include/comprise" or "including/comprising" in the text means the existence of feature, integral, step or component, but not excluding the existence or addition of one or more other features, integrals, steps or components.

DETAILED DESCRIPTION OF THE PREFERRED EMBODIMENTS

Figure 4:
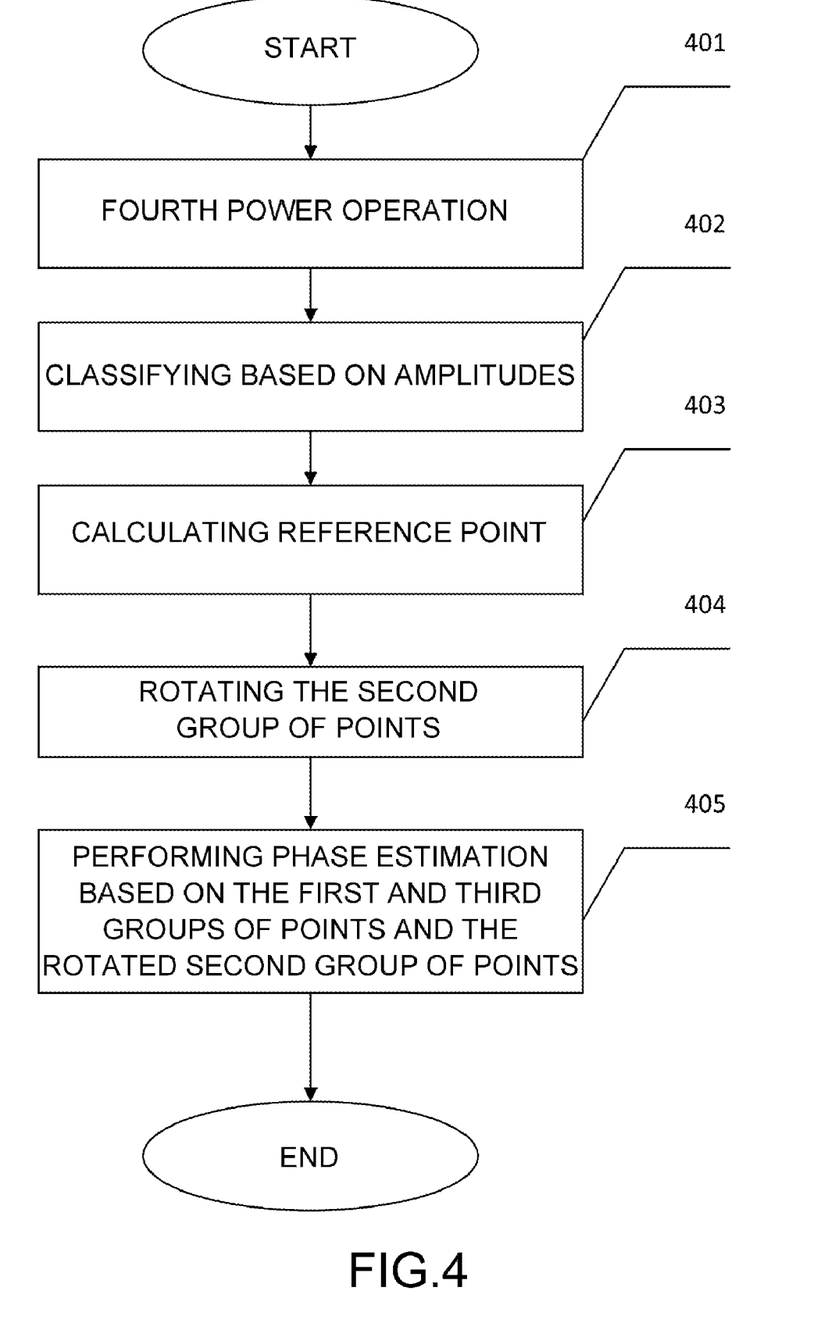
FIG. 4 schematically illustrates a processing flow of a phase recovery method according to an embodiment of the present invention.

The embodiment of the present invention is concretely described as follows in combination with the drawings. FIG. 4 schematically illustrates a processing flow of a phase recovery method according to an embodiment of the present invention. As shown in FIG. 4, firstly in step 401, fourth power operations are performed by for example a fourth power calculator for respective symbols (mathematically represented with a complex number I+jQ) in a symbol block, then in step 402, the symbols after the fourth power operations are classified based on their amplitudes, i.e., symbols having large (the third group of points) or small (the first group of points) amplitudes are classified into a first category, and symbols having intermediate (the second group of points) amplitudes are classified into a second category.

The symbols can be classified as follows.

According to an aspect of the present invention, firstly, an amplitude of a symbol after the fourth power operation is recovered to the amplitude before the fourth power operation (i.e., being divided by a cube of the module value of the symbol before the fourth power operation), and then the recovered amplitude is compared with a predetermined threshold. If the amplitude of the received signal is between T1 and T3, the symbol is judged as a second group point, and classified into the second category. If the amplitude is larger than T3, the symbol is judged as a third group point, and classified into the first category. If the amplitude is less than T1, the symbol is judged as a first group point, and also classified into the first category. T1 and T3 are recommended judgment thresholds:

$$T1=(R_1+R_2)/2 \quad T2=(R_2+R_3)/2 \qquad 1)$$

$R_1$, $R_2$, $R_3$ are amplitudes of ideal 16QAM constellation points.

After calculating the fourth power values of all the symbols in the symbol block and classifying all the symbols, calculating reference point in step 403.

In an embodiment of the present invention, a method for calculating reference point r is for example as follows:

$$r = \sum_{x \in I, III} x - \beta \sum_{y \in II} y \qquad 2)$$

In the above equation, the first item means adding (vector adding) the points (symbols after the fourth power operations) in the first and third groups (i.e., the first category), the second item means adding the points (symbols after the fourth power operations) in the second group (i.e., the second category), β is a preset coefficient between 0 to 1, and preferably β=0.5.

After calculating the reference point r, rotating each point p of the second category in step 404. Concretely, the following operations are performed in an embodiment of the present invention.

1) Calculating an argument difference dA between point p (a symbol after the fourth power operation) and the reference point r, e.g., dA=arg(p/r), wherein arg( ) means a calculation of argument, thus the value of dA is within [−π, π].

Another method for determining argument difference is to calculate dA=arg(p)−arg(r) firstly, and then limit the value of dA within [−π, π] by using a module of 2π. A person skilled in the art can conceive of other methods for determining argument difference, and they are all within the scope of the present invention.

2) If an argument difference dA is between 0 and π, rotating point p by −α, i.e., rotating point p by −α around a coordinate origin on the I-Q plane (rotating by a clockwise, α=π−4*arctan(⅓)). Mathematically, the rotation operation can be indicated $$\begin{pmatrix} I \\ Q \end{pmatrix} = \begin{pmatrix} \cos\alpha & \sin\alpha \\ -\sin\alpha & \cos\alpha \end{pmatrix} \begin{pmatrix} I_1 \\ Q_1 \end{pmatrix},$$

wherein $(I_1, Q_1)$ are coordinates before the rotation, and $(I,Q)$ are coordinates after the rotation.

If the argument difference dA is between −π and 0, rotating point p by α around the origin on the I-Q plane (rotating by α anticlockwise).

Under ideal conditions, after this step, the second group of points are rotated to a negative direction of the lateral axis, and this is equivalent to eliminating the residual angular modulation.

Next, in step 405, performing phase estimation based on the first and third groups of points, as well as the rotated second group of points. The phase estimation includes operations such as average calculation, angle calculation and unwrapping.

The phase estimation can be performed with various methods known by a person skilled in the art, e.g., the technique disclosed in Literature 4 can be used. To be noted, when these methods are adopted, not only the first and third groups of points will be used, but also the rotated second group of points shall also be used.

According to an embodiment of the present invention, the reference point is calculated and the second category of points are rotated based on the reference point, and thus the second category of points can be sufficiently utilized to improve the accuracy of the phase estimation.

In the above embodiment, a fourth power operation is performed firstly, and then a symbol is classified based on the amplitudes after the fourth power operation. In an alternative embodiment, a symbol can be classified based on the amplitudes of respective symbols in a symbol block before the fourth power operations, and the symbol and its category can be together transferred to a fourth power calculator. The fourth power calculator calculates a fourth power value of the symbol, and respectively sends the fourth power value and the symbol category to the next step for calculating a reference point and performing a phase estimation.

That is to say, the symbol classification can be performed either before or after the fourth power operations. According to the context, "categories of respective symbols in a (the) symbol block" can mean symbol categories either before or after the fourth power operations. In the present invention, "classifying respective symbols in a symbol block into a first category having a large or small amplitude, and a second category having an intermediate amplitude" includes classifying either before or after the fourth power operations.

Figure 5:
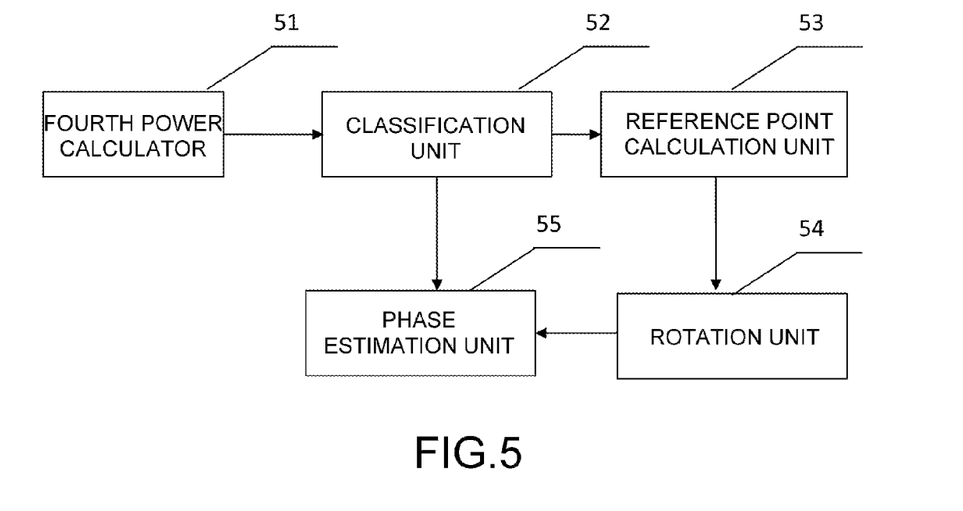
FIG. 5 illustrates a phase recovery device according to an embodiment of the present invention.

FIG. 5 illustrates a phase recovery device according to an embodiment of the present invention. As shown in FIG. 5, the phase recovery device according to an embodiment of the present invention comprises a fourth power calculator 51, a classification unit 52, a reference point determination unit 53, a rotation unit 54 and a phase estimation unit 55.

The fourth power calculator 51 calculates fourth power values of respective symbols in a symbol block. The classification unit 52 classifies respective symbols in the symbol block after the fourth power operations. The classification unit 52 firstly recovers the amplitudes of respective symbols after the fourth power operations to those before the fourth power operations, then classifies respective symbols in the symbol block after the fourth power operations into a first and third groups of points or a second group of points by comparing the recovered amplitudes with predetermined thresholds. The threshold selection is shown in Equation 1). The reference point determination unit 53 determines a reference point based on categories classified by the classification unit 52, by utilizing calculation results of the fourth power calculator, e.g., utilizing Equation 2). The rotation unit 54 rotates the second group of points (symbols of the second category after the fourth power operations) by utilizing the reference point. According to an embodiment, the rotation is performed based on argument differences between each of the second group of points and the reference point. The calculation of argument difference and the rotation of symbol are described in step 401. The phase estimation unit 55 performs phase estimations based on the first and third groups of points, as well as the rotated second group of points (to be described in the following text).

Figure 6:
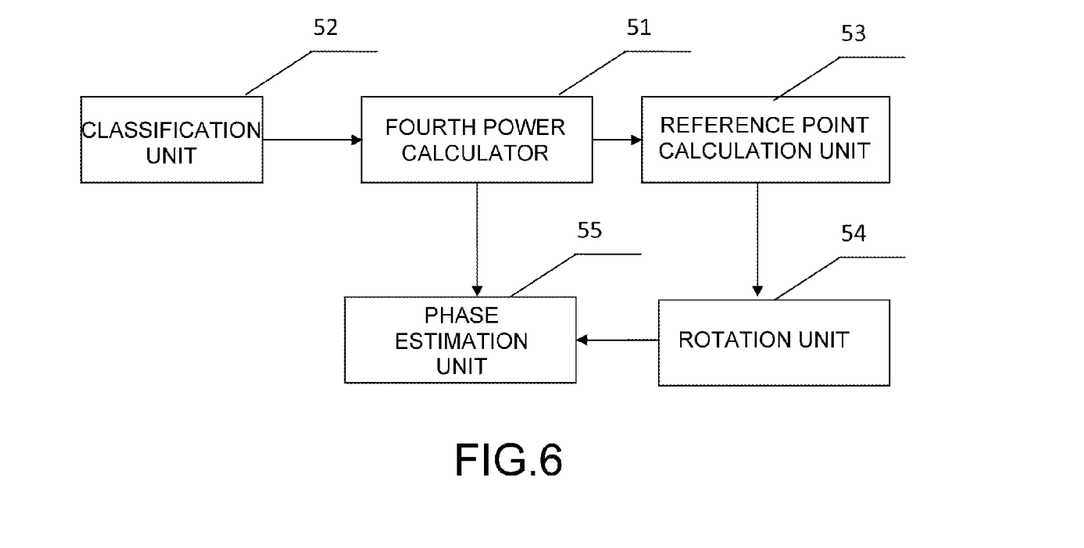
FIG. 6 illustrates a phase recovery device according to another embodiment of the present invention.

The classification unit 52 can also classify a symbol based on its amplitude before the fourth power operation. FIG. 6 illustrates a phase recovery device according to another embodiment of the present invention. The phase recovery device in FIG. 6 is substantially same as the phase recovery device in FIG. 5, except that the classification unit 51 classifies the symbols before the fourth power values of respective symbols being calculated by the fourth power calculator 51.

Figure 7:
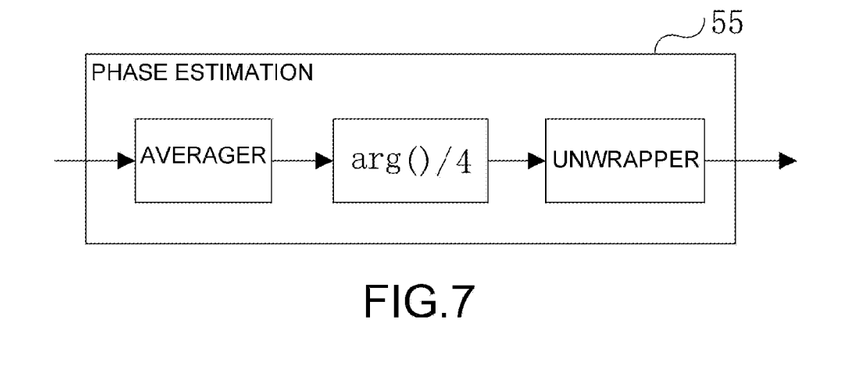
FIG. 7 illustrates an exemplary embodiment of a phase estimation unit.

FIG. 7 illustrates an exemplary embodiment of the phase estimation unit 55. As shown in FIG. 7, according to an embodiment, the phase estimation unit 55 may comprise an averager, an argument calculator and an unwrapper. The averager is used to calculate the average of the fourth power values of the first and third groups of points as well as the rotated second group of points. The argument calculator is used to calculate an argument of the average obtained by the averager and divides it by 4, arg( ) means an argument calculation. The unwrapper is used to upwrap the angle value outputted from the argument calculator.

The phase estimation unit 55 in FIG. 7 is just exemplary, and the invention can also use phase estimation means in other forms.

Figure 8:
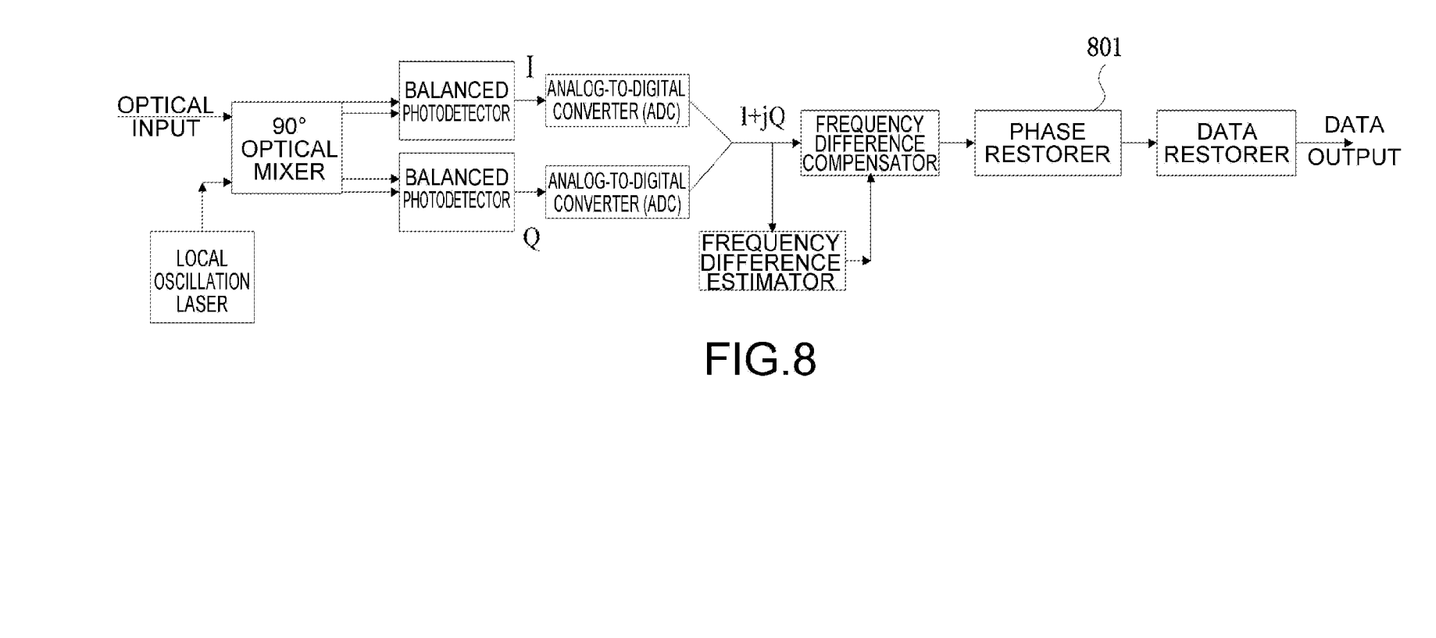
FIG. 8 illustrates the structure of a coherent optical receiver according to an embodiment of the present invention.

FIG. 8 illustrates the structure of a coherent optical receiver according to an embodiment of the present invention, wherein the phase restorer 801 can be the phase recovery device in respective embodiments of the present invention. The structure of the coherent optical receiver in FIG. 8 is just exemplary, and the phase recovery device of the present invention can be applied to coherent optical receivers of other forms.

The above device and method of the present invention can be implemented by hardware, or the combination of hardware and software. The present invention relates to such a computer readable program that enables a logic unit (e.g., field programmable gate array, microchip, CPU) to implement the functions of the previously described devices and components, or to implement the previously described methods and steps, when the program is executed by the logic unit. The present invention also relates to storage medium for storing the above program, e.g., hard disk, magnetic disk, optical disk, DVD and flash memory.

The present invention is described in combination with the above embodiments. But a person skilled in the art shall be clear that the descriptions are just exemplary, instead of limitations to the protection scope of the present invention. A person skilled in the art can make various modifications and changes to the present invention based on spirit and principle of the present invention, and those modifications and changes are also within the scope of the present invention.

What is claimed is:

1. A phase recovery device for 16 QAM data modulation, comprising:
   a fourth power calculator for calculating fourth power values of respective symbols in a symbol block;
   a classification unit for classifying respective symbols in the symbol block based on amplitudes, so as to classify respective symbols in the symbol block into a first category having a large or small amplitude, and a second category having an intermediate amplitude;
   a reference point determination unit for determining a reference point based on categories of respective symbols in the symbol block and their fourth power values;
   a rotation unit for rotating respective symbols in the symbol block undergone the fourth power operations and being classified into the second category, based on the reference point; and
   a phase estimation unit for performing symbol phase estimations based on respective symbols in the symbol block undergone the fourth power operations and being classified into the first category, and respective rotated symbols in the symbol block undergone the fourth power operations and being classified into the second category.

2. The phase recovery device for 16 QAM data modulation according to claim 1, wherein, the reference point determination unit determines the reference point by:
   determining a first sum of the symbols in the symbol block undergone the fourth power operations and being classified into the first category;
   determining a second sum of the symbols in the symbol block undergone the fourth power operations and being classified into the second category;

subtracting the second sum multiplied by a coefficient from the first sum, wherein the coefficient is not less than 0 and not more than 1.

3. The phase recovery device for 16 QAM data modulation according to claim 2, wherein the coefficient is 0.5.

4. The phase recovery device for 16 QAM data modulation according to claim 1, wherein the rotation unit rotates the symbols in the symbol block undergone the fourth power operations and being classified into the second category by:
  determining an argument difference between each of the symbols in the symbol block undergone the fourth power operations and being classified into the second category and the reference point;
  if the argument difference is between 0 to $\pi$, rotating corresponding symbol in the symbol block undergone the fourth power operation and being classified into the second category by $-\alpha$, $\alpha-4\times\arctan(\frac{1}{3})$;
  if the argument difference is between $-\pi$ to 0, rotating corresponding symbol in the symbol block undergone the fourth power operation and being classified into the second category by $\alpha$.

5. A digital coherent optical receiver, wherein, the digital coherent optical receiver comprises the phase recovery device for 16 QAM data modulation according to claim 1.

6. A phase recovery method for 16 QAM data modulation, the method used in a phase recovery device and comprising:
  the phase recovery device calculating fourth power values of respective symbols in a symbol block;
  the phase recovery device classifying respective symbols in the symbol block based on amplitudes, so as to classify respective symbols in the symbol block into a first category having a large or small amplitude, and a second category having an intermediate amplitude;
  the phase recovery device determining a reference point based on categories of respective symbols in the symbol block and their fourth power values;
  the phase recovery device rotating symbols in the symbol block undergone the fourth power operations and being classified into the second category, based on the reference point; and
  the phase recovery device performing symbol phase estimations based on respective symbols in the symbol block undergone the fourth power operations and being classified into the first category, and respective rotated symbols in the symbol block undergone the fourth power operations and being classified into the second category.

7. The phase recovery method for 16 QAM data modulation according to claim 6, wherein, the determining determines the reference point by:
  determining a first sum of the symbols in the symbol block undergone the fourth power operations and being classified into the first category;
  determining a second sum of the symbols in the symbol block undergone the fourth power operations and being classified into the second category;
  subtracting the second sum multiplied by a coefficient from the first sum, wherein the coefficient is not less than 0 and not more than 1.

8. The phase recovery method for 16 QAM data modulation according to claim 7, wherein the coefficient is 0.5.

9. The phase recovery method for 16 QAM data modulation according to claim 6, wherein the rotating rotates the symbols in the symbol block undergone the fourth power operations and being classified into the second category by:
  determining an argument difference between each of the symbols in the symbol block undergone the fourth power operations and being classified into the second category and the reference point;
  if the argument difference is between 0 to $\pi$, rotating corresponding symbol in the symbol block undergone the fourth power operation and being classified into the second category by $-\alpha$, $\alpha=\pi-4\times\arctan(\frac{1}{3})$;
  if the argument difference is between $-\pi$ to 0, rotating corresponding symbol in the symbol block undergone the fourth power operation and being classified into the second category by $\alpha$.

10. The phase recovery method for 16 QAM data modulation according to claim 6, wherein the classifying firstly recovers the amplitudes of respective symbols undergone the fourth power operations to those before the fourth power operation, then compares the recovered amplitudes of respective symbols with predetermined thresholds T1 and T3, if the recovered amplitudes are between T1 and T3, the symbols are classified into the second category, otherwise classified into the first category,
  wherein
  T1=(R1+R2)/2, T2=(R2+R3)/2, R1, R2 and R3 are amplitudes of ideal 16QAM constellation points.

* * * * *

UNITED STATES PATENT AND TRADEMARK OFFICE
CERTIFICATE OF CORRECTION

PATENT NO. : 8,331,496 B2
APPLICATION NO. : 12/896476
DATED : December 11, 2012
INVENTOR(S) : Meng Yan et al.

It is certified that error appears in the above-identified patent and that said Letters Patent is hereby corrected as shown below:

Column 9, Line 18, Claim 4, delete "α-4×arctan (1/3);" and insert -- $\alpha=\pi-4\times\arctan(1/3)$; --, therefor.

Column 10, Line 44, Claim 10, delete "16QAM" and insert -- 16 QAM --, therefor.

Signed and Sealed this
Twenty-sixth Day of March, 2013

Teresa Stanek Rea
*Acting Director of the United States Patent and Trademark Office*